(12) United States Patent
Oketani

(10) Patent No.: US 10,206,182 B2
(45) Date of Patent: Feb. 12, 2019

(54) MOBILE STATION, BASE STATION, METHODS FOR TRANSMITTING AND RECEIVING POWER HEADROOM REPORT, AND COMPUTER READABLE MEDIUM

(71) Applicant: NEC Corporation, Tokyo (JP)

(72) Inventor: Kengo Oketani, Tokyo (JP)

(73) Assignee: NEC Corporation, Tokyo (JP)

( * ) Notice: Subject to any disclaimer, the term of this patent is extended or adjusted under 35 U.S.C. 154(b) by 392 days.

(21) Appl. No.: 14/761,385

(22) PCT Filed: Aug. 20, 2013

(86) PCT No.: PCT/JP2013/004902
§ 371 (c)(1),
(2) Date: Jul. 16, 2015

(87) PCT Pub. No.: WO2014/115196
PCT Pub. Date: Jul. 31, 2014

(65) Prior Publication Data
US 2015/0327186 A1 Nov. 12, 2015

(30) Foreign Application Priority Data

Jan. 25, 2013 (JP) ................................. 2013-012196

(51) Int. Cl.
*H04W 52/36* (2009.01)
*H04W 72/04* (2009.01)
*H04L 5/00* (2006.01)

(52) U.S. Cl.
CPC ........... *H04W 52/365* (2013.01); *H04L 5/001* (2013.01); *H04W 72/0413* (2013.01); *H04W 72/0473* (2013.01)

(58) Field of Classification Search
CPC ........... H04W 52/365; H04W 72/0413; H04W 72/0473; H04L 5/001
See application file for complete search history.

(56) References Cited

U.S. PATENT DOCUMENTS 8,982,801 B2 * 3/2015 Shin .................... H04W 52/146
370/311
9,014,031 B2 * 4/2015 Suzuki ................ H04W 52/365
370/252
(Continued)

FOREIGN PATENT DOCUMENTS

CN 101616423 A 12/2009
CN 101674654 A 3/2010
(Continued)

OTHER PUBLICATIONS

3GPP TS 36.321 V10.6.0, "Medium Access Control (MAC) protocol specification", 3$^{rd}$ Generation Partnership Project, Technical Specification Group Radio Access Network, Evolved Universal Terrestrial Radio Access (E-UTRA), Release 10, pp. 1-54, Sep. 2012.

(Continued)

*Primary Examiner* — Jay P Patel
(74) *Attorney, Agent, or Firm* — Finnegan, Henderson, Farabow, Garrett & Dunner, L.L.P.

(57) ABSTRACT

A mobile station (1) has a capability to communicate with a base station (2) simultaneously using activated first and second uplink carriers. The mobile station (1) is configured to transmit a power headroom report to the base station (2). The power headroom report includes an information element ($\Delta P_{PUSCH}$) indicating a power difference between first maximum transmission power of the mobile station (1) for the first uplink carrier and second maximum transmission power of the mobile station (1) for the second uplink carrier. It is thus, for example, possible to provide improvement of power headroom reporting (PHR) suitable for uplink carrier aggregation.

21 Claims, 4 Drawing Sheets

(56) References Cited

U.S. PATENT DOCUMENTS

| | | | | |
|---|---|---|---|---|
| 9,025,541 | B2* | 5/2015 | Kim | H04W 52/367 370/329 |
| 9,078,264 | B2* | 7/2015 | Han | H04W 52/365 |
| 9,084,209 | B2* | 7/2015 | Gaal | H04W 52/146 |
| 9,794,894 | B2* | 10/2017 | Feuersaenger | H04W 52/365 |
| 2010/0238863 | A1* | 9/2010 | Guo | H04L 5/0046 370/328 |
| 2011/0081936 | A1* | 4/2011 | Haim | H04W 52/367 455/522 |
| 2011/0092217 | A1* | 4/2011 | Kim | H04W 52/367 455/450 |
| 2011/0250918 | A1* | 10/2011 | Jen | H04W 52/08 455/509 |
| 2011/0292874 | A1 | 12/2011 | Ho et al. | |
| 2012/0113915 | A1* | 5/2012 | Chen | H04W 52/365 370/329 |
| 2012/0115537 | A1* | 5/2012 | Gaal | H04W 52/146 455/522 |
| 2012/0218904 | A1* | 8/2012 | Narasimha | H04L 5/001 370/248 |
| 2012/0224535 | A1* | 9/2012 | Kim | H04W 52/367 370/328 |
| 2012/0224552 | A1* | 9/2012 | Feuersanger | H04L 5/0007 370/329 |
| 2012/0263060 | A1* | 10/2012 | Suzuki | H04W 52/365 370/252 |
| 2013/0010720 | A1* | 1/2013 | Lohr | H04L 1/0026 370/329 |
| 2013/0028223 | A1* | 1/2013 | Kim | H04L 5/0007 370/329 |
| 2013/0051259 | A1* | 2/2013 | Kim | H04L 5/001 370/252 |
| 2013/0121297 | A1* | 5/2013 | Kim | H04L 5/001 370/329 |
| 2013/0148560 | A1* | 6/2013 | Yang | H04B 7/024 370/311 |
| 2015/0139173 | A1* | 5/2015 | Jung | H04L 5/001 370/329 |
| 2017/0142664 | A1* | 5/2017 | Seo | H04W 52/146 |
| 2017/0359787 | A1* | 12/2017 | Kim | H04W 52/367 |
| 2018/0007642 | A1* | 1/2018 | Feuersaenger | H04W 72/042 |

FOREIGN PATENT DOCUMENTS

| | | | | |
|---|---|---|---|---|
| WO | WO 2011/056001 A3 * | 5/2011 | | H04W 52/365 |
| WO | WO 2011/150361 A1 | 12/2011 | | |

OTHER PUBLICATIONS

International Search Report dated Nov. 5, 2013, in corresponding PCT International Application.

Notification of First Office Action issued by The State Intellectual Property Office of the People's Republic of China Patent Office in counterpart Chinese Patent Application No. 201380071414.7, dated Nov. 16, 2017.

* cited by examiner

MOBILE STATION, BASE STATION, METHODS FOR TRANSMITTING AND RECEIVING POWER HEADROOM REPORT, AND COMPUTER READABLE MEDIUM

CROSS-REFERENCE TO RELATED PATENT APPLICATIONS

This application is a National Stage Entry of International Application No. PCT/JP2013/004902, filed Aug. 20, 2013, which claims priority from Japanese Patent Application No. 2013-012196, filed Jan. 25, 2013. The entire contents of the above-referenced applications are expressly incorporated herein by reference.

TECHNICAL FIELD

The present invention relates to radio communication and, in particular, to power headroom reporting in a radio communication system using a plurality of uplink carriers.

BACKGROUND ART

3GPP Release 10 (LTE-Advanced) defines a mode in which a physical uplink shared channel PUSCH) and a physical uplink control channel (PUCCH) are simultaneously transmitted on the same subframe. In this mode, a mobile station (user equipment (UE)) is allowed to simultaneously transmit the PUSCH and the PUCCH in the same subframe. The PUSCH is an uplink physical channel mainly used for transmitting user data. The PUCCH is an uplink physical channel used for transmitting layer 1/layer 2 control signals, such as channel quality information (CQI), a rank indicator (RI), cyclic redundancy check (CRC) results, and a hybrid automatic repeat request acknowledgement (HARQ-ACK).

In addition, the 3GPP Release 10 defines carrier aggregation (CA) in which a mobile station communicates with a base station (an eNB) simultaneously using a plurality of carriers in either or both of an uplink and a downlink. Each carrier used for carrier aggregation is called a component carrier (CC). That is, when the CA is used, there is a plurality of serving cells, and each serving cell corresponds to each component carrier. RRC connection between an eNB and a UE is provided in one serving cell, i.e., a primary serving cell. A component carrier of the primary serving cell is called a primary component carrier (PCC). Other serving cells are called secondary serving cells, and a component carrier of each secondary serving cell is called a secondary component carrier (SCC). A PUCCH is transmitted on an uplink PCC. Meanwhile, a PUCCH is not transmitted on an uplink SCC. One or more secondary serving cells (SCCs) are activated (added) and deactivated (deleted) as necessary. A system bandwidth of one component carrier is a maximum of 20 MHz. Since the 3GPP Release10 specifies CA of up to 5 component carriers, each of an uplink and downlink bandwidth can be extended up to 100 MHz.

Further, in the 3GPP Release 10, the UE that supports uplink CA and supports simultaneous transmission of a PUSCH and a PUCCH performs extended Power Headroom Reporting (PHR) (see Sections 5.4.6 and 6.1.3.6 of Non-Patent Literature 1). The extended PHR includes UE's maximum transmission power information $P_{CMAX, c}(k)$ and power headroom level information $PH_c(k)$ regarding each of activated uplink component carriers.

Specifically, two types of power headroom are defined in order to deal with the simultaneous transmission of the PUSCH and the PUCCH. The type-1 power headroom corresponds to a case where only a PUSCH is transmitted on an uplink component carrier, and it is calculated by the following Formula (1):

$$PH_{type1,k} = P_{CMAX,k} - P_{PUSCH,k} \quad (1)$$

where $P_{CMAX, k}$ represents UE's maximum transmission power for the uplink component carrier k, and $P_{PUSCH, k}$ represents estimated PUSCH transmission power for the uplink component carrier k.

The type-2 power headroom corresponds to a case where a PUSCH and a PUCCH are simultaneously transmitted on an uplink component carrier, and it is calculated by the following Formula (2):

$$PH_{type2,k} = P_{CMAX,k} - P_{PUSCH,k} - P_{PUCCH,k} \quad (2)$$

where the $P_{CMAX, k}$ and the $P_{PUSCH, k}$ are the same as those defined in relation to Formula (1), and $P_{PUCCH, k}$ represents estimated PUCCH transmission power for the uplink component carrier k.

As already mentioned, a secondary serving cell does not transmit a PUCCH. Accordingly, a secondary serving cell (i.e., a secondary component carrier (SCC)) always reports a type-1 PHR. Meanwhile, a primary serving cell transmits a PUCCH and a PUSCH. Accordingly, a primary serving cell (i.e., a primary component carrier (PCC)) reports a type-1 power headroom or a type-2 power headroom. Specifically, a primary serving cell reports a type-2 PHR, when simultaneous transmission of a PUCCH and a PUSCH is configured.

FIGS. 1 and 2 show power headroom of each component carrier when carrier aggregation of two uplink component carriers UL_CC#1 and UL_CC#2 is performed. FIG. 1 shows an example in which each of the UL_CC#1 and the UL_CC#2 transmits a type-1 PHR. Meanwhile, FIG. 2 shows an example in which the UL_CC#1 (i.e., the PCC) is configured to transmit a PUCCH and a PUSCH simultaneously and reports the type-2 PHR. As is apparent from FIGS. 1 and 2 and the above-mentioned Formulas (1) and (2), power headroom means a transmission power margin of a UE.

CITATION LIST

Non Patent Literature

[Non-Patent Literature 1] 3GPP TS 36.321 V10.6.0 (2012 September), "Evolved Universal Terrestrial Radio Access (E-UTRA); Medium Access Control (MAC) protocol specification (Release 10)"

SUMMARY OF INVENTION

Technical Problem

The inventor has conducted a study on PHR when uplink CA is performed, has found some problems on it, and devised some improvements to PHR suitable for uplink CA.

For example, as mentioned above, an extended PHR transmitted by a UE, which supports uplink CA and simultaneous transmission of a PUSCH and a PUCCH, includes maximum transmission power information $P_{CMAX, k}$ and power headroom level information $PH_k$ regarding each of activated uplink component carriers. Accordingly, when performing carrier aggregation of two uplink component carriers UL_CC#1 and UL_CC#2, a UE is required to transmit $PH_1$ and $P_{CMAX, 1}$ regarding the UL_CC#1 and $PH_2$ and $P_{CMAX, 2}$ regarding UL_CC#2. However, it may be preferable that a data amount that a UE should transmit in the PHR is as small as possible.

In addition, for example, an eNB performs scheduling of uplink radio resources (i.e., physical resource blocks) based on received PHR from a UE. Accordingly, it may be preferable that contents of a PHR are defined to be capable of decreasing a processing amount (a processing load) for performing scheduling in an eNB.

Accordingly, an object of the present invention is to provide a mobile station, a base station, methods for transmitting and receiving a power headroom report, and a program that contribute to improvement of PHR suitable for uplink CA.

Solution to Problem

In a first aspect, a mobile station includes a radio communication unit and a control unit. The radio communication unit has a capability to communicate with a base station simultaneously using activated first and second uplink carriers. The control unit is configured to transmit a power headroom report to the base station. The power headroom report includes a first information element indicating a power difference between first maximum transmission power of the mobile station for the first uplink carrier and second maximum transmission power of the mobile station for the second uplink carrier.

In a second aspect, method, in a mobile station for transmitting a power headroom report, includes transmitting, to a base station, a power headroom report regarding activated first and second uplink carriers. The power headroom report includes a first information element indicating a power difference between first maximum transmission power of the mobile station for the first uplink carrier and second maximum transmission power of the mobile station for the second uplink carrier.

In a third aspect, a base station includes a radio communication unit and a control unit. The radio communication unit has a capability to communicate with a mobile station simultaneously using activated first and second uplink carriers. The control unit is configured to receive a power headroom report from the mobile station. The power headroom report includes a first information element indicating a power difference between first maximum transmission power of the mobile station for the first uplink carrier and second maximum transmission power of the mobile station for the second uplink carrier.

In a fourth aspect, a method, in a base station for receiving a power headroom report, includes receiving, from a mobile station, a power headroom report regarding activated first and second uplink carriers. The power headroom report includes a first information element indicating a power difference between first maximum transmission power of the mobile station for the first uplink carrier and second maximum transmission power of the mobile station for the second uplink carrier.

In a fifth aspect, a program includes instructions for causing a computer to perform the method for transmitting a power headroom report according to the above second aspect.

In a sixth aspect, a program includes instructions for causing a computer to perform the method for receiving a power headroom report according to the above fourth aspect.

In a seventh aspect, a mobile station includes a radio communication unit and a control unit. The radio communication unit is configured to support uplink carrier aggregation of a plurality of uplink carriers including first and second uplink carriers. The control unit is configured to transmit to a base station a power headroom report when the uplink carrier aggregation is performed. Although the power headroom report includes both an information element indicating a first power headroom level for the first uplink carrier and an information element indicating a second power headroom level for the second uplink carrier, the power headroom report includes neither an information element indicating maximum transmission power of the mobile station for the first uplink carrier nor an information element indicating maximum transmission power of the mobile station for the second uplink carrier.

In an eighth aspect, a base station includes a radio communication unit and a control unit. The radio communication unit is configured to support uplink carrier aggregation of a plurality of uplink carriers including first and second uplink carriers. The control unit is configured to receive from a mobile station a power headroom report when the uplink carrier aggregation is performed. Although the power headroom report includes both an information element indicating a first power headroom level for the first uplink carrier and an information element indicating a second power headroom level for the second uplink carrier, the power headroom report includes neither an information element indicating maximum transmission power of the mobile station for the first uplink carrier nor an information element indicating maximum transmission power of the mobile station for the second uplink carrier.

Advantageous Effects of Invention

According to the above-mentioned aspects, it is possible to provide a mobile station, a base station, methods for transmitting and receiving a power headroom report, and a program that contribute to improvement of PHR suitable for uplink CA.

DESCRIPTION OF EMBODIMENTS

Hereinafter, with reference to the drawings, specific embodiments will be described in detail. Throughout the drawings, identical or corresponding components are denoted by the same reference symbols, and overlapping descriptions will be omitted as appropriate for the sake of clarification of description.

First Embodiment

Figure 1:
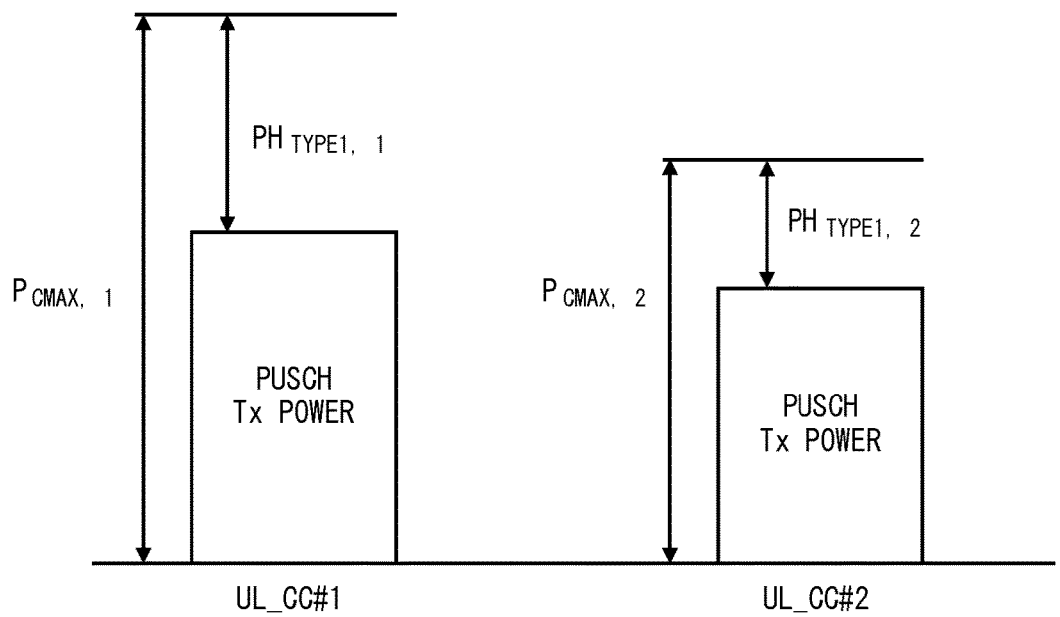
FIG. 1 illustrates a definition of power headroom according to a background art.
Figure 2:
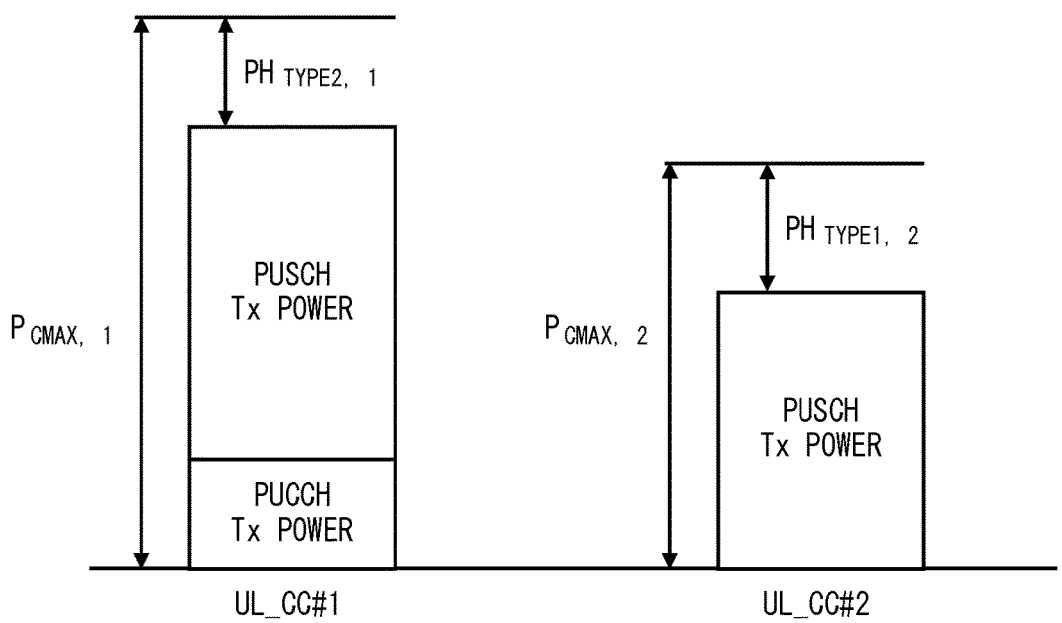
FIG. 2 illustrates a definition of the power headroom according to background art.
Figure 3:
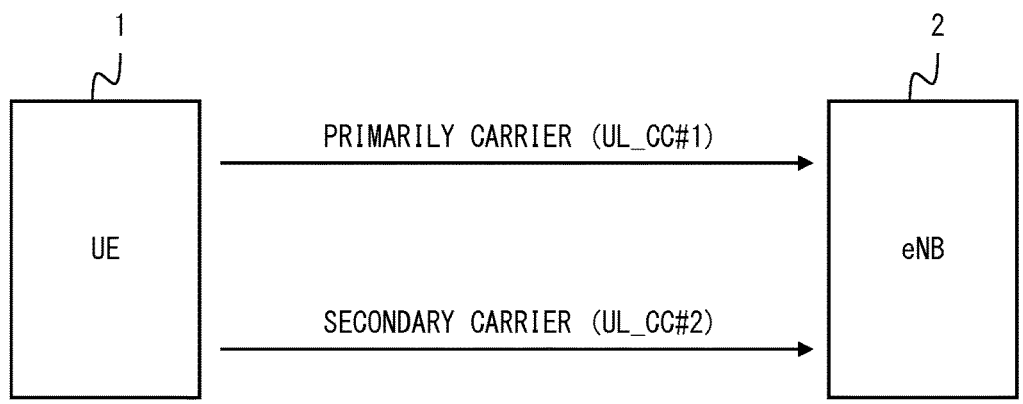
FIG. 3 illustrates a radio communication system that performs uplink carrier aggregation according to a first embodiment.

FIG. 3 shows a radio communication system according to the embodiment. The radio communication system according to the embodiment includes a mobile station (UE) 1 and a base station (an eNB) 2. The UE 1 and the eNB 2 support uplink carrier aggregation using at least two component carriers. The UE 1 performs transmission to the eNB 2 on at least two uplink component carriers UL_CC#1 and UL_CC#2. Hereinafter, carrier aggregation (CA) of two component carriers is mainly explained for facilitation of explanation. In an example of FIG. 1, the first carrier UL_CC#1 is designated as a primary component carrier, and the second carrier UL_CC#2 is designated as a secondary component carrier. That is, the UE 1 can transmit a PUCCH and a PUSCH on the first carrier UL_CC#1, and can transmit a PUSCH on the second carrier UL_CC#1.

Figure 4:
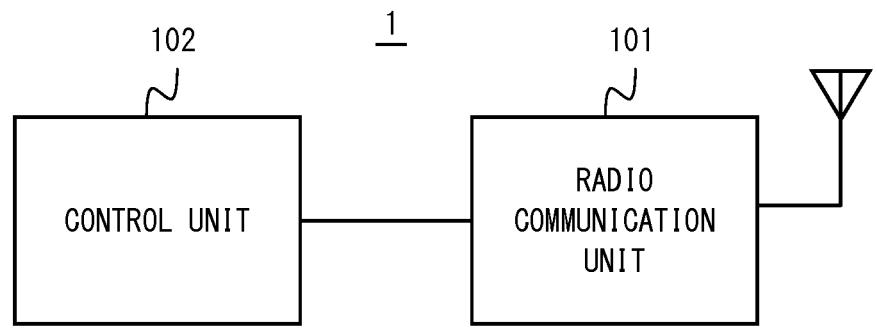
FIG. 4 is a block diagram showing a configuration example of a mobile station according to the first embodiment.

FIG. 4 is a block diagram showing a configuration example of the UE 1. A radio communication unit 101 is a radio transceiver, supports uplink CA, and has a capability to communicate with the eNB 2 simultaneously using activated first and second uplink carriers (UL_CC#1 and UL_CC#2). A control unit 102 transmits, to the eNB 2, a PHR regarding the activated carriers UL_CC#1 and UL_CC#2. Here, the PHR includes information indicating a power difference (relative power) $\Delta P_{CMAX}$ between maximum transmission power $P_{CMAX,\ 1}$ of the UE 1 for the first carrier UL_CC#1 and maximum transmission power $P_{CMAX,\ 2}$ of the UE 1 for the second carrier UL_CC#2. The difference $\Delta P_{CMAX}$ is defined by the following Formula (3):

$$\Delta P_{CMAX} = P_{CMAX,2} - P_{CMAX,1} \quad (3)$$

The PHR may include a power headroom level $PH_1$ (i.e., a $PH_{type1,\ 1}$ or a $PH_{type2,\ 1}$) of the UE 1 for the first carrier UL_CC#1, and a power headroom level $PH_2$ (i.e., a $PH_{type1,\ 2}$) of the UE 1 for the second carrier UL_CC#2. Specifically, the PHR according to the embodiment may just include a total of three information elements of the $PH_1$, the $PH_2$, and the $\Delta P_{CMAX}$.

Figure 5:
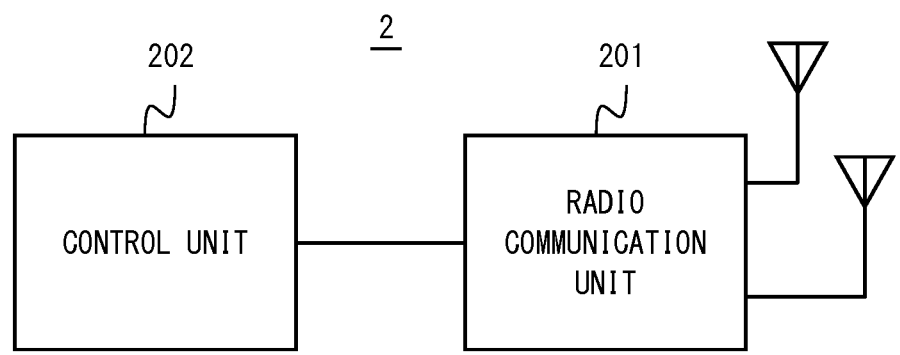
FIG. 5 is a block diagram showing a configuration example of a base station according to the first embodiment.

FIG. 5 is a block diagram showing a configuration example of the eNB 2. A radio communication unit 201 is a radio transceiver, supports uplink CA, and has a capability to communicate with the UE 1 simultaneously using activated first and second uplink carriers (UL_CC#1 and UL_CC#2). A control unit 202 receives the above-mentioned PHR from the UE 1. The control unit 202 may perform scheduling including allocating an uplink radio resource to the UE 1, using the PHR received from the UE 1.

Figure 6:
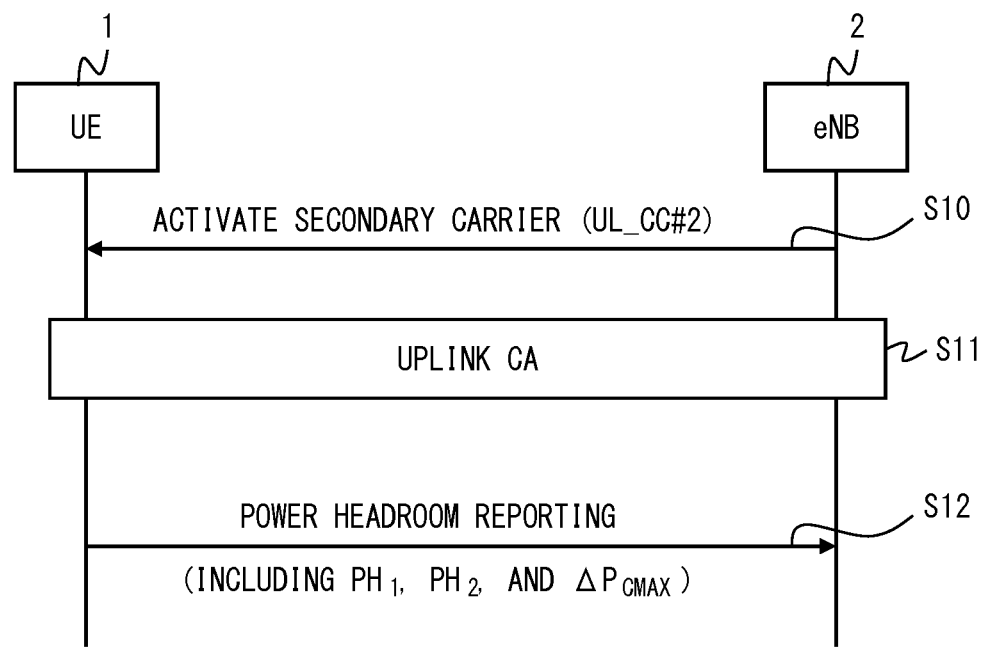
FIG. 6 is a sequence diagram showing one example of a transmission/reception procedure of a power headroom report according to the first embodiment.

FIG. 6 is a sequence diagram showing one example of a transmission/reception procedure of PHR according to the embodiment. In step S10, the eNB 2 activates the second carrier UL_CC#2 as a secondary component carrier. In other words, the eNB 2 activates a secondary serving cell, and starts uplink CA. In step S11, the UE 1 and the eNB 2 perform the uplink CA. In step S12, the UE 1 transmits a PHR to the eNB 2. As mentioned above, the PHR includes a difference $\Delta P_{CMAX,\ c}$ in the maximum transmission power of the UE 1 between the first carrier and the second carrier.

As mentioned above, in the embodiment, the UE 1 transmits the improved PHR including the difference $\Delta P_{CMAX}$ of the maximum transmission power. In one example, the PHR according to the embodiment may just include the total of three information elements of the $PH_1$, the $PH_2$, and the $\Delta P_{CMAX}$. In this case, the embodiment allows a data amount of the PHR to be reduced, compared with a case of transmitting a total of four information elements of the $PH_1$, the $PH_2$, the $P_{CMAX,\ 1}$, and the $P_{CMAX,\ 2}$.

In another example, the number of information elements of the PHR transmitted by the UE 1 may be the same as an extended PHR defined in 3GPP Release 10. In this case, the UE 1 may send $\Delta P_{CMAX}$ and zero (or another invalid value) instead of the two information elements $P_{CMAX,\ 1}$ and $P_{CMAX,\ 2}$ included in a PHR defined in the 3GPP Release 10. As a result of this, since the eNB 2 need not calculate the $\Delta P_{CMAX}$ for uplink scheduling, a processing amount (processing load) of the eNB 2 can be reduced.

Hereinafter, a specific example of uplink scheduling in the eNB 2 based on the PHR according to the embodiment will be explained. As one example, modified PH of each component carrier k in consideration of estimated transmission power (i.e., $P_{PUSCH,\ k}$ or $P_{PUSCH,\ k}\ P_{PUCCH,\ k}$) of the UE 1 on activated (aggregated) uplink component carriers can be defined as following Formula (4):

$$PH_{A,k}(i) = 10^{\frac{P_{CMAX,k}(i)}{10}} - \sum_{m=1}^{Ncell} 10^{\frac{P_{CMAX,m}(i) - PH_m(i)}{10}} \ [mW] \quad (4)$$

where a subscript i represents a subframe number, and Ncell represents the number of aggregated component carriers (the number of aggregated cells).

As is apparent from Formula (4), the modified PH (i.e., $PH_{A,\ k}$) of the component carrier k is defined as a value obtained by subtracting total transmission power of the UE 1 on the Ncell number of component carriers from the maximum transmission power $P_{CAMX,\ k}$ of the UE 1 for the component carrier k. For example, transmission power of the plurality of component carriers must be taken into consideration from restrictions related to the total transmission power of the UE 1, or restrictions due to a physical configuration, such as two or more component carriers being amplified by a single power amplifier.

Further, by using Formula (4), an uplink radio resource amount (i.e., an uplink resource block amount) that can be additionally allocated to the UE 1 in the component carrier k can be evaluated by the following Formula (5):

[Formula 5]

$$R_{RB,k} = \frac{PH_{A,k}(i)}{10^{\frac{P_{CMAX,k}(i) - PH_k(i)}{10}}} = 10^{\frac{PH_k(i)}{10}} \left(1 - \sum_{m=1}^{N_{cell}} 10^{\frac{\Delta P_{CMAX,m}(i) - PH_m(i)}{10}}\right), \quad (5)$$

where $\Delta P_{CMAX,m}(i) = P_{CMAX,m}(i) - P_{CMAX,k}(i)$

As is apparent from Formula (5), the ratio $R_{RB,\ k}$ described in the left side of Formula (5) is defined as a ratio of the modified PH to the transmission power of the UE 1 in the uplink component carrier k. Accordingly, the eNB 2 can derive resource blocks that can be additionally allocated to the UE 1 by multiplying the number of resource blocks allocated to the UE 1 in the subframe i with the factor $R_{RB,\ k}$ defined in Formula (5).

Further, according to a definition of Formula (5), when the number of aggregated uplink component carriers is 2 (i.e., Ncell=2), $\Delta P_{CMAX,\ 1}(i)$ regarding the first component carrier (k=1) is zero and $\Delta P_{CMAX,\ 2}(i)$ corresponds to the difference $\Delta P_{CMAX}$ shown in Formula (3). In addition, $\Delta P_{CMAX,\ 1}(i)$ regarding the second component carrier (k=2) corresponds to sign inversion ($-\Delta P_{CMAX}$) of the difference $\Delta P_{CMAX}$ shown in Formula (3) and the $\Delta P_{CMAX,\ 2}(i)$ is zero. Accordingly, the eNB 2 can perform scheduling to the UE 1 on the two uplink component carriers UL_CC#1 and UL_CC#2 based on Formula (5) by receiving from the UE 1 the PHR including the total of three information elements of the $PH_1$, the $PH_2$, and the $\Delta P_{CMAX}$.

Furthermore, for example, the embodiment can contribute to reduction of the data amount of the PHR also when three or more uplink component carriers are aggregated. Specifically, when the number of uplink component carriers is Ncell (Ncell is an integer not less than 1), the PHR may just indicate (Ncell−1) number of power differences (relative power), each between maximum transmission power for one reference component carrier and maximum transmission power for a respective one of the other (Ncell−1) number of component carriers. For example, when the reference component carrier is the first carrier UL_CC#1, the PHR may include $\Delta P_{CMAX, 2}$ ($=P_{CMAX, 2}-P_{CMAX, 1}$), $\Delta P_{CMAX, 3}$ ($=P_{CMAX, 3}-P_{CMAX, 1}$), . . . , and $\Delta P_{CMAX, Ncell}$ ($=P_{CMAX, Ncell}-P_{CMAX, 1}$). If the Ncell is equal to 3, the PHR may include $\Delta P_{CMAX, 2}$ and $\Delta P_{CMAX, 3}$.

Note that, although the power difference between the $P_{CMAX, 2}$ and the $P_{CMAX, 3}$ (i.e., $P_{CMAX, 3}-P_{CMAX, 2}$ or $P_{CMAX, 2}-P_{CMAX, 3}$) is needed in order to calculate additionally allocatable uplink radio resource amounts $R_{RB, 2}$ and $R_{RB, 3}$ in the second carrier UL_CC#2 and the third carrier UL_CC#3 according to Formula (5), the value thereof can be easily calculated using the $\Delta P_{CMAX, 2}$ and the $\Delta P_{CMAX, 3}$. That is, a relation of $P_{CMAX, 3}-P_{CMAX, 2}=\Delta P_{CMAX, 3}-\Delta P_{CMAX, 2}$ is established. For this reason, the PHR need not indicate power differences regarding all combinations of Ncell component carriers (i.e., a total of Ncell*(Ncell−1)/two number of differences), and may just indicate the total (Ncell−1) number of power differences between the reference component carrier and the other (Ncell−1) component carriers. Accordingly, the embodiment can for example contribute to reduction of the data amount of the PHR also when three or more uplink component carriers are aggregated.

In addition, when three or more uplink component carriers are aggregated, the number of information elements of the PHR transmitted by the UE 1 may be the same as the extended PHR defined in the 3GPP Release 10. In this case, the UE 1 may send the (Ncell−1) number of power differences (for example, the $\Delta P_{CMAX, 2}$, the $\Delta P_{CMAX, 3}$, . . . , and the $\Delta P_{CMAX, Ncell}$) and one zero (or another invalid value), instead of Ncell information elements $P_{CMAX, 1}$, $P_{CMAX, 2}$, . . . and $P_{CMAX, Ncell}$ included in the PHR of the 3GPP Release 10. As a result of this, since the eNB 2 need not calculate the (Ncell−1) number of power differences for uplink scheduling, the processing amount (processing load) of the eNB 2 can be reduced.

Second Embodiment

A modification of the above-mentioned first embodiment will be explained in the embodiment. A configuration of a radio communication system according to the embodiment is similar to the example of the first embodiment shown in FIG. 3. Specifically, also in the embodiment, the UE 1 and the eNB 2 perform carrier aggregation of the two uplink component carriers UL_CC#1 and UL_CC#2. Further, in the embodiment, approximations are introduced into a "path loss $PL_k$ between the UE 1 and the eNB 2" and a "parameter $\alpha_k(j)$ regarding path loss compensation", which are utilized for determining the PUSCH transmission power $P_{PUSCH, k}$ on the uplink component carrier k. The eNB 2 can perform uplink scheduling for the UE 1 with much fewer parameters by the introduction of the approximations. As a result of this, in the embodiment, information elements that should be included in the PHR from the UE 1 are further reduced.

The transmission power $P_{PUSCH, k}(i)$ of the UE 1 for PUSCH transmission in subframe i is defined by the following Formula (6) (see section 5.1.1 of 3GPP TS 36.213):

$$P_{PUSCH,k}(i) = \min\left\{\begin{array}{l} P_{CMAX,k}(i), \\ 10\log_{10}(M_{PUSCH,k}(i)) + P_{O\_PUSCH,k}(j) + \\ \alpha_k(j) \cdot PL_k + \Delta_{TF,k}(i) + f_k(i) \end{array}\right\}[dBm] \quad (6)$$

where a definition of each parameter is as follows:
k: an index of an uplink component carrier (UL_CC);
$P_{PUSCH, k}(i)$: PUSCH transmission power of the UE 1 for the uplink component carrier k (UL_CC#k) in the subframe i;
$P_{CMAX, k}(i)$: maximum transmission power of the UE 1 for the UL_CC#k in the subframe i;
$M_{PUSCH, k}(i)$: the number of resource blocks allocated to the UE 1 in the UL_CC#k in the subframe i;
$P_{O\_PUSCH, k}(j)$: a parameter regarding a required signal to interference ratio (SIR) for the PUSCH on the UL_CC#k;
$\alpha_k(j)$: a parameter regarding path loss compensation for the UL_CC#k;
$PL_K$: a path loss between the UE 1 and the eNB 2 for the UL_CC#k;
$\Delta_{TF, k}(i)$: a parameter that varies according to an MCS (modulation and coding scheme) for the UL_CC#k in the subframe i; and
$f_k(i)$: a closed-loop transmission power command for the UL_CC#k and the subframe i.

Firstly, in the embodiment, the following approximation (assumption) is introduced in relation to the path loss $PL_k$. The path loss reference regarding the component carrier UL_CC#2 is assumed to be the component carrier UL_CC#1. As a result of this, in the UE 1, the path loss $PL_1$ on the carrier UL_CC#1 (i.e., $PL_1=PL_2$) is substituted for the path loss $PL_2$ on the carrier UL_CC#2.

Secondly, the following approximation (assumption) is introduced in relation to the parameter $\alpha_k(j)$. The parameter $\alpha_1(j)$ regarding the carrier UL_CC#1 is assumed to be equal to the parameter $\alpha_2(j)$ regarding the carrier UL_CC#2 (i.e., $\alpha_1(j)=\alpha_2(j)$).

By utilizing the above-mentioned two approximations (assumptions) and Formula (6), a type-1 power headroom level $PH_{type1, 2}(i)$ regarding the second component carrier UL_CC#2 can be modified as the following Formula (7):

$$PH_{type1,2}(i) = P_{CMAX,2}(i) - \{10\log_{10}(M_{PUSCH,2}(i)) + P_{O\_PUSCH,2}(j) + \quad (7)$$

$$\alpha_2(j) \cdot PL_2 + \Delta_{TF,c}(i) + f_2(i)\}$$

$$= P_{CMAX,1}(i) + \Delta P_{CMAX,2}(i) - \left\{\begin{array}{l} 10\log_{10}(M_{PUSCH,1}(i)) + \\ 10\log_{10}(M_{PUSCH,2}(i)/ \\ M_{PUSCH,1}(i)) + \\ +P_{O\_PUSCH,1}(j) + \\ (P_{O\_PUSCH,2}(j) - \\ P_{O\_PUSCH,1}(j)) + \alpha_1(j) \cdot \\ PL_1 + (\alpha_2(j) \cdot PL_2 - \\ \alpha_1(j) \cdot PL_1) + \\ \Delta_{TF,1}(i) + (\Delta_{TF,2}(i) - \\ \Delta_{TF,1}(i)) + f_1(i) + (f_2(i) - \\ f_1(i)) \end{array}\right\}$$

-continued $$= P_{CMAX,1}(i) - \{10\log_{10}(M_{PUSCH,1}(i)) + P_{O\_PUSCH,1}(j) +$$

$$\alpha_1(j) \cdot PL_1 + \Delta_{TF,1}(i) + f_1(i)\} +$$

$$\Delta P_{CMAX,2}(i) - \begin{Bmatrix} 10\log_{10}(M_{PUSCH,2}(i)/M_{PUSCH,1}(i)) + \\ (P_{O\_PUSCH,2}(j) - P_{O\_PUSCH,1}(j)) + \\ (\alpha_2(j) \cdot PL_2 - \alpha_1(j) \cdot PL_1) + \\ (\Delta_{TF,2}(i) - \Delta_{TF,1}(i)) + \\ (f_2(i) - f_1(i)) \end{Bmatrix}$$

$$= PH_{type1,1}(i) + \Delta P_{CMAX,2}(i) - \begin{Bmatrix} 10\log_{10}(M_{PUSCH,2}(i)/\\ M_{PUSCH,1}(i)) + \\ (P_{O\_PUSCH,2}(j) - \\ P_{O\_PUSCH,1}(j)) + \\ (\alpha_2(j) \cdot PL_2 - \alpha_1(j) \cdot \\ PL_1) + (\Delta_{TF,2}(i) - \\ \Delta_{TF,1}(i)) + \\ (f_2(i) - f_1(i)) \end{Bmatrix}$$

$$= PH_{type1,1}(i) + \Delta P_{CMAX,2}(i) - \begin{Bmatrix} 10\log_{10}(M_{PUSCH,2}(i)/\\ M_{PUSCH,1}(i)) + \\ (P_{O\_PUSCH,2}(j) - \\ P_{O\_PUSCH,1}(j)) + \\ (\Delta_{TF,2}(i) - \Delta_{TF,1}(i)) + \\ (f_2(i) - f_1(i)) \end{Bmatrix}$$

Approximations of $PL_1=PL_2$ and $\alpha_1(j)=\alpha_2(j)$ are applied to last formula modification of the right side in Formula (7). In addition, all parameters included in parentheses at the third term in the last right side are configured by the eNB 2 to the UE 1, and are known values that can be calculated in the eNB 2. That is, the following Formula (8) is established in relation to the type-1 power headroom level $PH_{type1,2}(i)$ regarding the second component carrier UL_CC#2:

$$PH_{type1,2}(i) = PH_{type1,1}(i) + \Delta P_{CMAX,2}(i) - \{\text{known value in } eNB\} \qquad (8)$$

Formula (8) includes the three information elements contained in the PHR of the UE 1 mentioned in the first embodiment, i.e., the $PH_1$, the $PH_2$, and the $\Delta P_{CMAX}$. From this fact, it can be understood that one more information element can be reduced from the three information elements contained in the PHR of the UE 1, i.e., the $PH_1$, the $PH_2$, and the $\Delta P_{CMAX}$, by introducing the approximations of $PL_1=PL_2$ and $\alpha_1(j)=\alpha_2(j)$.

In one example, the UE 1 may send only $PH_1(i)$ and $\Delta P_{CMAX,2}(i)$ as information elements of the PHR. This is because the information element $PH_2(i)$, which has not been transmitted, can be derived by the eNB 2 from the received two information elements $PH_1(i)$ and $\Delta P_{CMAX,2}(i)$ and Formula (8). The control unit 202 of the eNB 2 can perform the uplink scheduling for the UE 1 mentioned in the first embodiment by using the derived $PH_2(i)$ and the report values (i.e., the $PH_1(i)$ and the $\Delta P_{CMAX,2}(i)$) from the terminal.

Alternatively, in another example, the UE 1 may transmit only the $PH_1(i)$ and the $PH_2(i)$ as the information elements of the PHR. In this case, the eNB 2 can derive the $\Delta P_{CMAX,2}(i)$ using Formula (8) and can perform the uplink scheduling for the UE 1 mentioned in the first embodiment. Further, alternatively, the UE 1 may transmit only the $\Delta P_{CMAX,2}(i)$ and the $PH_2(i)$ as the information elements of the PHR. In this case, the eNB 2 can derive the $PH_1(i)$ using Formula (8) and can perform the uplink scheduling for the UE 1 mentioned in the first embodiment.

Other Embodiments

The PHR transmission method in the UE 1 and the PHR reception and scheduling methods in the eNB 2 described in the first and second embodiments may be implemented by using a semiconductor processing device including an Application Specific Integrated Circuit (ASIC). Alternatively, these methods may be implemented by causing a computer system including at least one processor (e.g., microprocessor, Micro Processing Unit (MPU), Digital Signal Processor (DSP)) to execute a program. Specifically, one or more programs including instructions for causing a computer system to perform the algorithms shown in the flowcharts and the sequence diagrams may be created and these programs may be supplied to a computer.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide a program to a computer via a wired communication line (e.g., electric wires, and optical fibers) or a wireless communication line.

In the above first and second embodiments, a LTE-advanced system has been mainly described. However, these embodiments may be applied to radio communication systems, other than a LTE-advanced system, that perform carrier aggregation.

Further, the above embodiments are merely examples of applications of technical ideas obtained by the present inventors. Needless to say, these technical ideas are not limited to the above embodiments and may be changed in various ways.

This application is based upon and claims the benefit of priority from Japanese Patent Application No. 2013-012196, filed on Jan. 25, 2013, the disclosure of which is incorporated herein in its entirety by reference.

REFERENCE SIGNS LIST

1 MOBILE STATION
2 BASE STATION
101 RADIO COMMUNICATION UNIT
102 CONTROL UNIT
201 RADIO COMMUNICATION UNIT
202 CONTROL UNIT

The invention claimed is:
1. A method in a mobile station for transmitting a power headroom report, the method comprising:
    transmitting, to a base station, a power headroom report regarding activated first and second uplink carriers, the power headroom report including a first information element indicating a power difference between first maximum transmission power of the mobile station for the first uplink carrier and second maximum transmission power of the mobile station for the second uplink carrier.

2. The method according to claim 1, wherein the power headroom report includes neither an information element indicating the first maximum transmission power nor an information element indicating the second maximum transmission power.

3. The method according to claim 1, wherein the power headroom report further includes an information element indicating a first power headroom level for the first uplink carrier and an information element indicating a second power headroom level for the second uplink carrier.

4. The method according to claim 1, wherein
the power headroom report relates to Ncell number of uplink carriers including the first and second uplink carriers, and
the power headroom report further includes (Ncell-2) number of information elements that each indicates a power difference between the first maximum transmission power and maximum transmission power of the mobile station on a respective one of the (Ncell-2) number of uplink carriers excluding the first and second uplink carriers.

5. A method in a base station for receiving a power headroom report, the method comprising:
receiving, from a mobile station, a power headroom report regarding activated first and second uplink carriers, the power headroom report including a first information element indicating a power difference between first maximum transmission power of the mobile station for the first uplink carrier and second maximum transmission power of the mobile station for the second uplink carrier.

6. The method according to claim 5, wherein the power headroom report includes neither an information element indicating the first maximum transmission power nor an information element indicating the second maximum transmission power.

7. The method according to claim 5, wherein the power headroom report further includes an information element indicating a first power headroom level for the first uplink carrier and an information element indicating a second power headroom level for the second uplink carrier.

8. The method according to claim 5, wherein
the power headroom report relates to Ncell number of uplink carriers including the first and second uplink carriers, and
the power headroom report further includes (Ncell-2) number of information elements that each indicates a power difference between the first maximum transmission power and maximum transmission power of the mobile station on a respective one of the (Ncell-2) number of uplink carriers excluding the first and second uplink carriers.

9. The method according to claim 5, further comprising performing scheduling including allocating an uplink radio resource to the mobile station based on the power headroom report.

10. The method according to claim 9, wherein the scheduling includes calculating a radio resource amount that can be additionally allocated to the mobile station in at least one of the first and second uplink carriers.

11. A mobile station comprising:
a radio transceiver, comprising at least one hardware processor, configured to communicate with a base station simultaneously using activated first and second uplink carriers; and
a controller, comprising at least one hardware processor, configured to transmit a power headroom report to the base station, the power headroom report including a first information element indicating a power difference between first maximum transmission power of the mobile station for the first uplink carrier and second maximum transmission power of the mobile station for the second uplink carrier.

12. The mobile station according to claim 11, wherein the power headroom report includes neither an information element indicating the first maximum transmission power nor an information element indicating the second maximum transmission power.

13. The mobile station according to claim 11, wherein the power headroom report further includes an information element indicating a first power headroom level for the first uplink carrier and an information element indicating a second power headroom level for the second uplink carrier.

14. The mobile station according to claim 11, wherein
the power headroom report relates to Ncell number of uplink carriers including the first and second uplink carriers, and
the power headroom report further includes (Ncell-2) number of information elements that each indicates a power difference between the first maximum transmission power and maximum transmission power of the mobile station on a respective one of the (Ncell-2) number of uplink carriers excluding the first and second uplink carriers.

15. A base station comprising:
a radio transceiver, comprising at least one hardware processor, configured to communicate with a mobile station simultaneously using activated first and second uplink carriers; and
a controller, comprising at least one hardware processor, configured to receive a power headroom report from the mobile station, the power headroom report including a first information element indicating a power difference between first maximum transmission power of the mobile station for the first uplink carrier and second maximum transmission power of the mobile station for the second uplink carrier.

16. The base station according to claim 15, wherein the power headroom report includes neither an information element indicating the first maximum transmission power nor an information element indicating the second maximum transmission power.

17. The base station according to claim 15, wherein the power headroom report further includes an information element indicating a first power headroom level for the first uplink carrier and an information element indicating a second power headroom level for the second uplink carrier.

18. The base station according to claim 15, wherein
the power headroom report relates to Ncell number of uplink carriers including the first and second uplink carriers, and
the power headroom report further includes (Ncell-2) number of information elements that each indicates a power difference between the first maximum transmission power and maximum transmission power of the mobile station on a respective one of the (Ncell-2) number of uplink carriers excluding the first and second uplink carriers.

19. The base station according to claim 15, wherein the controller is configured to perform scheduling including allocating an uplink radio resource to the mobile station based on the power headroom report.

20. The base station according to claim 19, wherein the scheduling includes calculating a radio resource amount that can be additionally allocated to the mobile station in at least one of the first and second uplink carriers.

21. The base station according to claim 19, wherein the scheduling includes calculating an uplink radio resource amount RRB, k that can be additionally allocated to the mobile station in an uplink carrier k according to the following two Formulas:

$$PH_{A,k} = 10^{\frac{P_{CMAX,k}}{10}} - \sum_{m=1}^{Ncell} 10^{\frac{P_{CMAX,m}-PH_m}{10}} \text{ [mW]} \quad (9)$$

$$R_{RB,k} = \frac{PH_{A,k}}{10^{\frac{P_{CMAX,k}-PH_k}{10}}} = 10^{\frac{PH_k}{10}} \left(1 - \sum_{m=1}^{N_{cell}} 10^{\frac{\Delta P_{CMAX,m}-PH-m}{10}}\right), \quad (10)$$

where $\Delta P_{CMAX,m} = P_{CMAX,m} - P_{CMAX,k}$ where Ncell represents the number of aggregated uplink carriers, PCMAX, k represents maximum transmission power of the mobile station for the uplink carrier k, PHk represents a power headroom level for the uplink carrier k, PCMAX, m represents maximum transmission power of the mobile station on an uplink carrier m, and PHm indicates a power headroom level for the uplink carrier m.

* * * * *